United States Patent
Rouhi et al.

(10) Patent No.: US 11,128,544 B2
(45) Date of Patent: Sep. 21, 2021

(54) REMOTE WIRELESS SNIFFER MANAGEMENT

(71) Applicant: SEMICONDUCTOR COMPONENTS INDUSTRIES, LLC, Phoenix, AZ (US)

(72) Inventors: Ali Rouhi, Oakland, CA (US); Vladimir Dmitriev, Pleasanton, CA (US); Richard Kinder, Eastwood (AU); Sergey Naumov, Saint-Petersburg (RU); Raghuram Rangarajan, Fremont, CA (US); Jean-Paul Camille, Berkeley, CA (US); Imran Latif, Fremont, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/732,677

(22) Filed: Jan. 2, 2020

(65) Prior Publication Data
US 2020/0296013 A1 Sep. 17, 2020

Related U.S. Application Data

(60) Provisional application No. 62/821,945, filed on Mar. 21, 2019, provisional application No. 62/817,385, filed on Mar. 12, 2019.

(51) Int. Cl.
*H04L 12/24* (2006.01)
*H04L 29/06* (2006.01)
(Continued)

(52) U.S. Cl.
CPC .......... *H04L 41/5009* (2013.01); *G06F 11/34* (2013.01); *H04B 7/0452* (2013.01);
(Continued)

(58) Field of Classification Search
CPC . H04L 41/5009; H04L 43/00; H04L 63/1416; H04N 21/2223; H04W 72/0433;
(Continued)

(56) References Cited

U.S. PATENT DOCUMENTS 10,070,289 B1 * 9/2018 Inamdar .................. H04W 4/50
2004/0236851 A1 11/2004 Kuan et al.
(Continued)

OTHER PUBLICATIONS

International Search Report and Written Opinion PCT/US2020/012743 dated Apr. 20, 2020.
(Continued)

*Primary Examiner* — Michael A Keller
(74) *Attorney, Agent, or Firm* — Maschoff Brennan

(57) ABSTRACT

An example method may include receiving, from a wireless sniffer, sniffer data for a window of time, where the sniffer data may include wireless signal data. The method may also include obtaining corresponding access point data from an access point in a wireless network for at least part of the window of time for which the sniffer data is received. The method may additionally include analyzing the sniffer data and the corresponding access point data to assess performance of the wireless network.

20 Claims, 6 Drawing Sheets

(51) Int. Cl.
  H04W 24/08   (2009.01)
  H04W 24/10   (2009.01)
  G06F 11/34   (2006.01)
  H04L 12/26   (2006.01)
  H04B 7/0452  (2017.01)
  H04J 11/00   (2006.01)
  H04W 72/04   (2009.01)
  H04N 21/222  (2011.01)
  H04W 84/12   (2009.01)

(52) U.S. Cl.
  CPC ............ *H04J 11/003* (2013.01); *H04L 43/00* (2013.01); *H04L 63/1416* (2013.01); *H04N 21/2223* (2013.01); *H04W 24/08* (2013.01); *H04W 24/10* (2013.01); *H04W 72/0433* (2013.01); *H04W 84/12* (2013.01)

(58) Field of Classification Search
  CPC ..... H04W 24/10; H04W 24/08; H04W 84/12; H04B 7/0452; H04J 11/003; G06F 11/34
  See application file for complete search history.

(56) References Cited

U.S. PATENT DOCUMENTS

| | | | |
|---|---|---|---|
| 2010/0100930 A1* | 4/2010 | King | H04L 63/1433 726/1 |
| 2012/0213211 A1* | 8/2012 | Remaker | H04L 61/2092 370/338 |
| 2016/0081134 A1* | 3/2016 | Chow | G06F 16/335 455/419 |
| 2017/0099198 A1* | 4/2017 | Bhimavarapu | H04L 43/0864 |
| 2017/0127304 A1* | 5/2017 | Britt | H04W 24/08 |
| 2018/0183702 A1* | 6/2018 | Glik | H04W 24/08 |
| 2019/0132729 A1* | 5/2019 | Cariou | H04L 63/1458 |
| 2019/0230019 A1* | 7/2019 | Jiang | H04L 43/12 |
| 2019/0319863 A1* | 10/2019 | Gupta | H04L 41/142 |
| 2020/0106684 A1* | 4/2020 | Koffman | H04W 24/08 |

OTHER PUBLICATIONS

Portoles-Comeras M et al: "Monitoring wireless networks: performance assessment of sniffer architectures", Communications, 2006. ICC '06. IEEE International Conference on, IEEE, PI, Jun. 11, 2006 (Jun. 11, 2006), pp. 1-6, XP002476249, ISBN: 978-1-4244-0354-7.

Singh Rajinder et al: "A Comparative Study of Various Wireless Network Monitoring Tools", 2018 First International Conference on Secure Cyber Computing and Communication (ICSCCC), IEEE, Dec. 15, 2018 (Dec. 15, 2018), pp. 379-384, XP033544001, DOI: 10.1109/ICSCCC.2018.8703216 [retrieved on Apr. 29, 2019].

* cited by examiner

REMOTE WIRELESS SNIFFER MANAGEMENT

CROSS-REFERENCE TO RELATED APPLICATIONS

This patent application claims the benefit of prior filed U.S. Provisional Application No. 62/817,385 filed on Mar. 12, 2019 and prior filed U.S. Provisional Application No. 62/821,945 filed on Mar. 21, 2019. The 62/817,385 application and the 62/821,945 application are each incorporated herein by reference in their entireties.

FIELD

The implementations discussed herein are related to dynamic selection of receive parameters.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device or station (STA) utilizing the WLAN.

However, certain circumstances can cause problems with receiving or utilizing a WLAN by a STA, such as lack of signal strength, interference, etc. It can be difficult to identify and/or solve such problems.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to management of a remote wireless sniffer. Some implementations provide a method and/or apparatus to manage a remote wireless sniffer.

An example method may include receiving, from a wireless sniffer, sniffer data for a window of time, where the sniffer data may include wireless signal data. The method may also include obtaining corresponding access point data from an access point in a wireless network for at least part of the window of time for which the sniffer data is received. The method may additionally include analyzing the sniffer data and the corresponding access point data to assess performance of the wireless network.

The invention may be implemented in hardware, firmware, or software.

Associated devices and circuits are also claimed.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations thereof which are illustrated in the appended drawings. It is appreciated that these drawings depict only typical implementations of the invention and are therefore not to be considered limiting of its scope. The invention will be described and explained with additional specificity and detail using the accompanying drawings in which.

DETAILED DESCRIPTION OF SOME EXAMPLE IMPLEMENTATIONS

Figure 1:
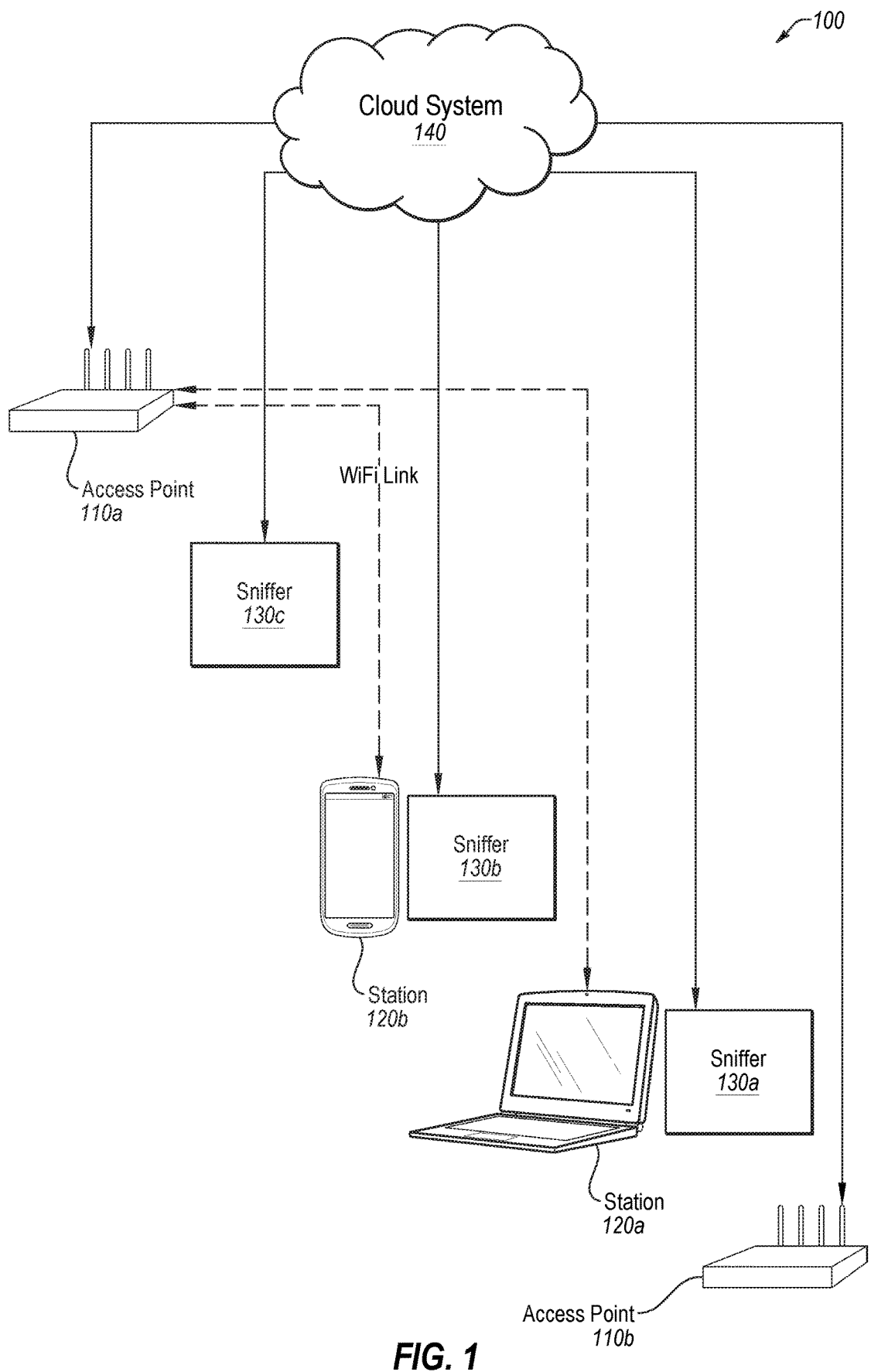
FIG. 1 illustrates an example operating environment that may implement remote management of a wireless sniffer.

Implementations described herein may generally include an approach to facilitate remote management of a wireless sniffer. For example, the use of a remote wireless sniffer may facilitate troubleshooting or other error correction without sending a technician or other individual to a premise.

Usage of Wi-Fi in internet connected devices is growing exponentially. If home, work or hotspot internet is available, the last hop for devices to access the internet is Wi-Fi. The Wi-Fi protocol (like all digital wireless systems) is very complex at the Physical (PHY), Medium Access Control (MAC) layers. With the proliferation of both number, types and usage of Wi-Fi devices; connectivity problems can and do occur frequently. These problems have diverse sources. For example, a client device (STA) may not work properly with a given Access Point (AP), or the medium may be very congested leading to poor and/or erratic performance. While APs and STA are required to go through Wi-Fi alliance certification to ensure interoperability, the combination of AP and STA models makes exhaustive testing of all combinations impossible.

The use of a wireless sniffer to obtain sniffer traces is a tool for system debugging in Wi-Fi networks. Wireless sniffers may operate in promiscuous mode capturing all packets in a channel and/or frequency to which the wireless sniffer is tuned. Information associated with both control and data plane issues or errors may be deduced from sniffer traces. For example, in the control plane, failed authentication attempts may be deduced; and in the data plane, excessive retry of packets may be deduced. However, the actual cause of the issues or errors may not be properly discerned from only such sniffer data. For example, in the case of excessive retries, the reason for the issue or error may be failure of the AP to receive the acknowledge (ACK) packets. The indication that some or most ACKs are not received is only present in data obtainable from the AP, and not in a sniffer trace.

On the other hand, data obtained from an AP is not sufficient by itself for some situations, such as when there is a hidden node (some device whose packets may interfere with communication between an AP and an STA, but which is not visible to the AP so that contention based medium access does not work well). In such a circumstance, the STA may not be receiving the packets transmitted by the AP due to interference not visible to the AP, leading to AP not seeing ACKs. This interference will be visible to a wireless sniffer that is in proximity to the STA. Thus, the cause of non-reception of ACKs may be due to a firmware tuning issue on the AP, a hidden node not observable by the AP, or other reasons. Without information from both the Wireless sniffer and the AP, it may be difficult to determine what may be the actual cause of the underlying issue or error.

As described in the present disclosure, by having information from wireless sniffers and AP, and correlating the two data sets together, may provide greater insight into determining a cause of an error and providing a potential solution. The data collection, analysis, and error resolution may be performed by a cloud computing system. While such data correlation and data analysis may be performed by a human operator, such an approach may be highly inefficient as the issue or error my come and go, or the operator may miss something, or simply arrive too late to observe the issue.

Reference will now be made to the drawings to describe various aspects of example implementations of the invention. It is to be understood that the drawings are diagrammatic and schematic representations of such example implementations, and are not limiting of the present invention, nor are they necessarily drawn to scale.

FIG. 1 illustrates an example operating environment 100 that may implement remote management of a wireless sniffer 130, in accordance with one or more embodiments of the present disclosure. The environment 100 includes one or more access points (APs) 110, stations (STAs) 120, wireless sniffers 130, and a cloud system 140. The solid arrows between the cloud system 140 and various components of the environment 100 illustrate a communication link between the cloud system 140 and the respective component, and the dashed arrows between the APs 110 and the STAs 120 illustrate a wireless connection, such as over a Wi-Fi network.

Figure 6:
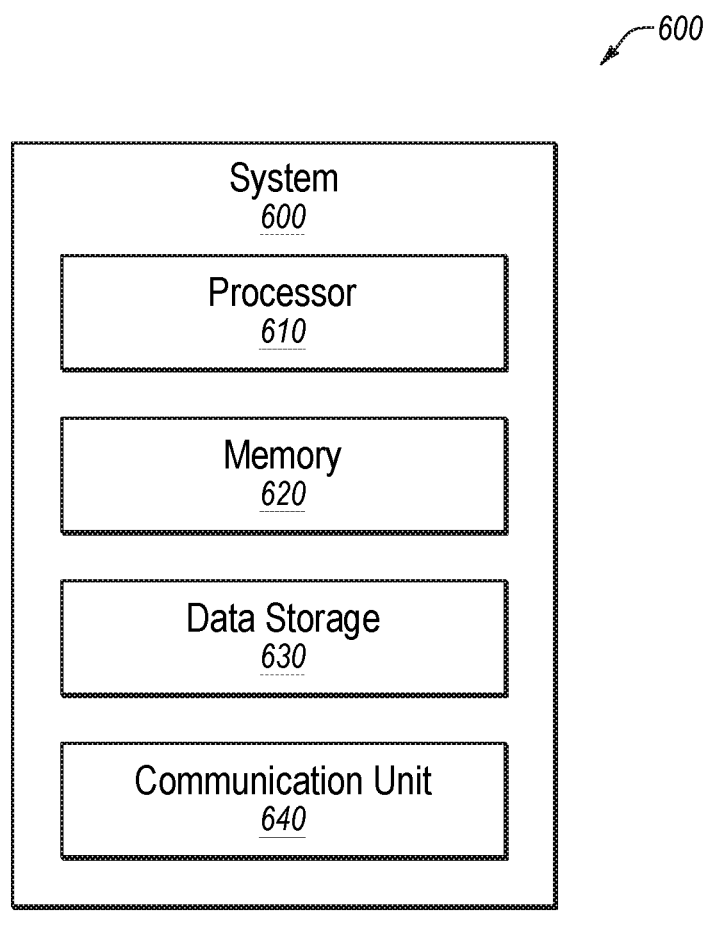
FIG. 6 illustrates an example computing device, all arranged in accordance with at least one implementation described herein.

The APs 110 (such as the APs 110a or 110b) may include a gateway, a repeater, a mesh node, and/or other suitable access point for wireless stations or devices such as the STAs 120. The APs 110 may connect to the Internet and/or a core network via a bridge, a backhaul link, a base station, and/or other suitable devices or connections. One example implementation of the APs 110 as a computing device is illustrated in FIG. 6.

Each of the STAs 120 may generally include any device that has the capability to wirelessly connect to the AP 106 according to any of the 802.11 standards or other suitable wireless standard. Each of the STAs 102, 104 may include a desktop computer, a laptop computer, a tablet computer, a mobile phone, a smartphone, a personal digital assistant (PDA), a smart television, or any other suitable wireless station. One example implementation of the APs 110 as a computing device is illustrated in FIG. 6.

The wireless sniffer 130 (such as the wireless sniffers 130a, 130b, and/or 130c) may include any device with an ability to "listen" to wireless signals or other network signals. For example, the wireless sniffer 130 may include one or more wireless network chips or cards that are set to a promiscuous mode such that all traffic that is received may be passed to a processor of the sniffer 130. In these and other embodiments, the wireless sniffer 130 may store the traffic that is observed in the environment 100. In some embodiments, the wireless sniffer 130 may operate with a rolling buffer that may store a previous set time and as that time expires, over-write or discard the old data. For example, if the rolling buffer covered two minutes, the preceding two minutes of data observed by the wireless sniffer 130 in the environment 100 may be stored and as the stored data is older than two minutes, that data may be discarded or written over with new data. In some embodiments, the wireless sniffer 130 may store such data in windows of time (e.g., a two-minute window of data as a single file) and may archive or otherwise store the window of time of data and being a new window of time. In some embodiments, the wireless sniffer 130 may be configured to hop between channels and/or frequencies. For example, if a premise includes APs 110 operating at two different channels in the 2.4 GHz band, the wireless sniffer 130 may hop between the two channels periodically. In some embodiments, the wireless sniffer 130 may include a repurposed or specially programmed laptop computer, mobile telephone, or other device with a wireless network chip or card. In some embodiments, the wireless sniffer 130 may be configured to continuously monitor or otherwise detect wireless signals.

In some embodiments, the wireless sniffer 130 may include one or more specialized or customizable features. For example, the wireless sniffer 130 may be a device that only "listens" to wireless signals and stores such data in a storage device accessible by a secondary computer. As another example, the wireless sniffer 130 may be programmable to shift between certain frequencies or channels at certain timer intervals or based on certain conditions. As a further example, the wireless sniffer 130 may be programmable to discard certain data or otherwise filter the obtained data. As an additional example, the wireless sniffer 130 may be programmable to transmit data.

In some embodiments, the wireless sniffer 130 may be configured to monitor for announcements within the wireless network accessible via the APs 110. For example, the wireless sniffer 130 may be configured to automatically pass along any announcement of a device joining the wireless network (e.g., when the STA 120b joins the wireless network), when a device drops from the wireless network, etc. For example, the wireless sniffer 130 may be configured to transmit such an announcement to the cloud system 140, regardless of whether or not the wireless sniffer 130 has received a trigger or other message requesting that the wireless sniffer 130 transmit data to the cloud system 140. Additionally or alternatively, the sniffer 130 may pass along any association attempts (e.g., attempts at joining the wireless network). In these and other embodiments, the same or similar information may also be obtained by the APs 110. For example, the APs may pass along announcement information of STAs 120 joining the wireless network.

In some embodiments, by using multiple sniffers 130, a resolution of signal strength as a device roams around the wireless network may be observed. For example, the use of the sniffers 130a, 130b, and 130c may permit a determination of relative signal strength of the station 120b as the STA 120b roams around a location covered by the APs 110a and 110b. In these and other embodiments, the cloud system 140 may utilize the data from the wireless sniffers 130 to provide a resolution of how far the STA 120b may roam before losing connectivity. Additionally or alternatively, such information from the wireless sniffers 130 may be used to predict the location, speed of movement, etc. for the STA 120b.

The wireless sniffer 130 may be configured to monitor for nefarious or malicious actions by third parties. In these and other embodiments, the wireless sniffer 130 may monitor for states that may indicate the presence of a distribution denial of service (DDOS) attack, a virus, malware, or some other activity of an unauthorized device. For example, the wireless sniffer 130 may monitor for a flooding increase of network activity, even if from multiple sources, and providing data to the cloud system 140 such that corrective action may be taken (e.g., blocking certain ranges of IP addresses, etc.). In these and other embodiments, corresponding data regarding the attacks may be provided by the AP 110.

The cloud system 140 may include any remote computing device in communication with the APs 110 and/or the wireless sniffers 130. For example, the cloud system 140 may include a cloud-hosted server able to utilize large pools of storage and/or processing resources for an economical price. The cloud system 140 may be remotely accessible for an administrator or other user. Some examples of the cloud system 140 include Amazon® Web Services, Google® Cloud Platform, Microsoft® Azure, etc.

In some embodiments, the cloud system 140 may be configured to send commands to and/or receive data from any of the other components of the environment 100 to change their respective modes of operation. For example, the cloud system 140 may send a message to the AP 110 to change a frequency or channel upon which it is broadcasting, to change its broadcasting power, to change bandwidth of a broadcasting channel, to toggle between multi-user, multiple-input, multiple-output (MU-MIMO) and single-user (SU)-MIMO, to switch on or off beam-forming to a particular STA 120, to power cycle, to change a receiving sensitivity, to change Aggregated MAC Protocol Data Unit (AMPDU)/Aggregated MAC Service Data Unit (AMSDU) aggregation sizes, etc., or any other feature or setting in the AP that may be turned on or off. In these and other embodiments, doing so may facilitate STAs 120 in joining the wireless network of the AP 110. Additionally or alternatively, such a message may change settings of the AP 110 such that it blocks or otherwise counteracts an attack (e.g., a DDOS attack) without human intervention. As another example, the cloud system 140 may send a message to the STA 120 to change settings of a wireless network card or chip, disable and/or reenable the wireless network card or chip, power cycle, suppress a power-saving mode, etc., or any other network-impacting feature or setting in the AP that may be turned on or off. As a further example, the cloud system 140 may be configured to send commands and/or receive data from the wireless sniffer 130. In some embodiments, the cloud system 140 may transmit a command to the wireless sniffer 130 to change a mode of operation or to request data. For example, the cloud system 140 may send a command to the wireless sniffer 130 to listen on a certain channel or frequency, to change a duration during which the wireless sniffer 130 collects data, to impose a filter on the data collected by the wireless sniffer 130, to change channels or frequencies at a certain rate, etc. As another example, the cloud system 140 may request that the last thirty seconds of data obtained by the wireless sniffer 130 and/or the next thirty seconds of data obtained by the wireless sniffer 130 be transmitted to the cloud system 140.

In some embodiments, the environment 100 may permit quick setup of a wireless sniffer 130 and calibrate the wireless sniffer 130 for a local environment/premise without the use of a field engineer that travels to the premise. For example, the cloud system 140 may instruct the wireless sniffer 130 to remotely start obtaining data on specified channel(s), one or both frequency bands (e.g., 2.4 or 5 GHz), store the obtained data on local storage of the wireless sniffer 130 (and/or a computing device communicatively coupled to the wireless sniffer 130, such as a laptop), remotely initiate upload of sniffer data for a specific window of time to the cloud system 140, receive notification when such an upload is complete, etc.

In some embodiments, local configuration and/or control of the wireless sniffer 130 may include install of a software program or package permitting remote access to the wireless sniffer 130 (such as a remote procedure call (RPC) package), positioning of the wireless sniffer 130. In some embodiments, the wireless sniffer 130 may receive remote instructions for automated implementation of local operations. For example, the wireless sniffer 130 may include a visual indicator (e.g., LCD, LED, etc.) or a mobile smartphone app may be used to assist a non-trained end user (e.g., not a field engineer or technician) for location placement, management, etc. For local control of the sniffer, a command line interface (CLI) tool or single page web application (SPA) may be used, whether directly to the wireless sniffer 130 or to an associated computing device (such as a control laptop, etc.).

In an example implementation, a user may initially setup the wireless sniffer 130 using guiding instructions, such as connecting to a local web interface of the wireless sniffer 130, obtaining a registration code, using the registration code to register the wireless sniffer 130 using credentials, providing a name or other identifier for the wireless sniffer 130, initialize the remote access to the wireless sniffer 130, and/or using a verification process to verify and/or authenticate the wireless sniffer 130 with the cloud system 140 (e.g., using a standard Oauth2 security scheme using physical access to the wireless sniffer 130 and credentials of the cloud system 140 with some registration code tying the two credentials together). Based on data obtained by the wireless sniffer 130, the user may be provided instructions to change or modify the location of the wireless sniffer 130 until it is at a desired location (e.g., at a location proximate a given STA 120, etc.). After these steps have been completed, the operation of the wireless sniffer 130 may be controlled by the cloud system 140.

In some embodiments, the cloud system 140 may correlate data from multiple devices in the environment such that events at the same time may be observed from the perspective of multiple devices (e.g., from both the wireless sniffer 130 and the AP 110). Such correlation may include a temporal correlation by which data from multiple devices may be designated as corresponding to the same point in time. Such temporal correlation may include data from the AP 110 and the wireless sniffer 110 being time stamped reliably, for example by using the Network Time Protocol (NTP). In these and other embodiments, the cloud system 140 may perform analysis on the data to detect an error and/or determine a potential solution or remedy for an error. Various examples of such analysis, detection, etc. are described throughout the present disclosure.

Modifications, additions, or omissions may be made to the environment 100 without departing from the scope of the present disclosure. For example, the designations of different elements in the manner described is meant to help explain concepts described herein and is not limiting. Further, the environment 100 may include any number of other elements or may be implemented within other systems or contexts than those described. For example, any number of wireless sniffers 130 and/or APs 110 servicing any number of STAs 120 may be included in the environment.

Figure 2:
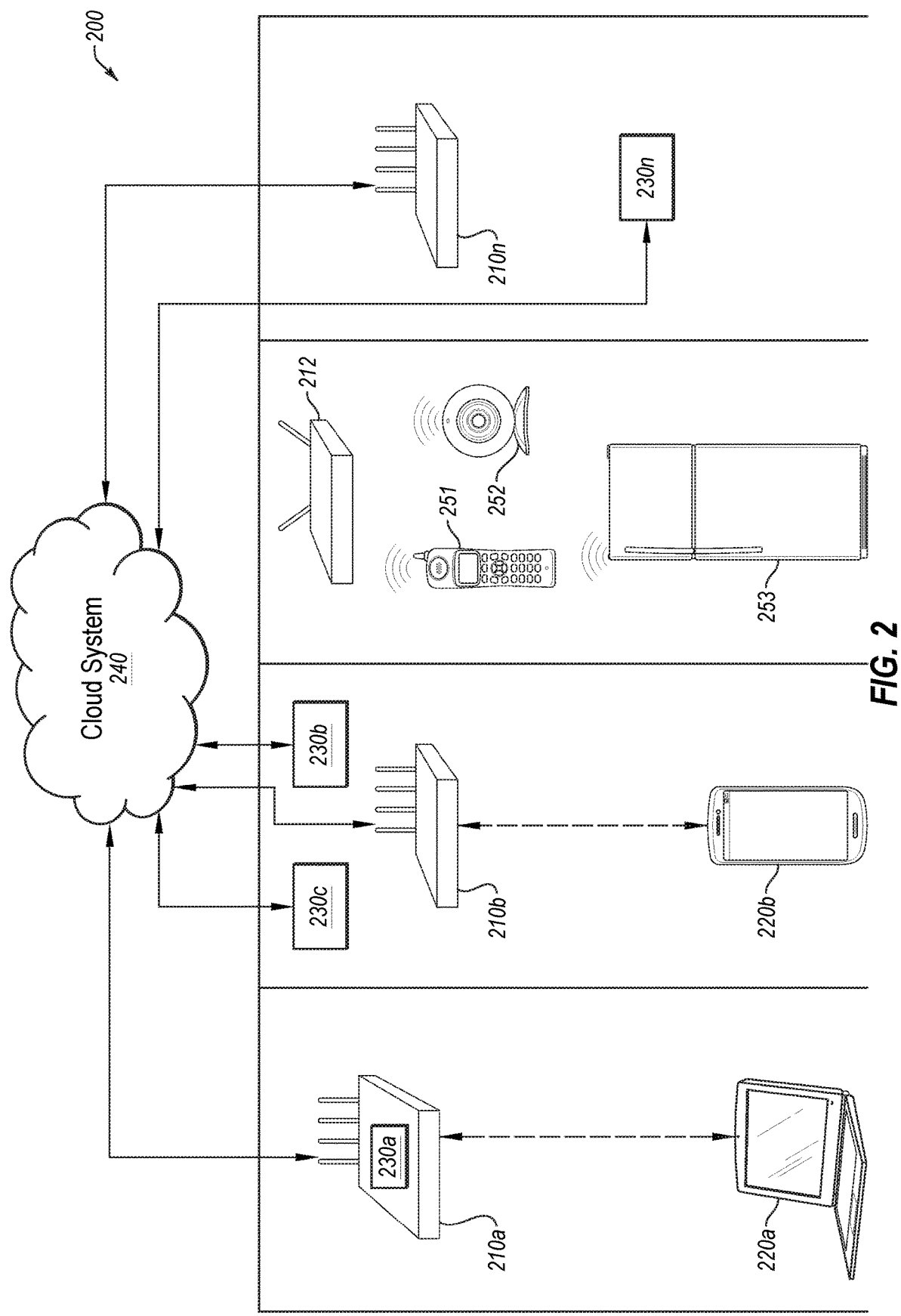
FIG. 2 illustrates another example operating environment that may implement remote management of a wireless sniffer.

FIG. 2 illustrates another example operating environment 200 that may implement remote management of a wireless sniffer 230, in accordance with one or more embodiments of the present disclosure. The environment 200 may be similar or comparable to the environment 100, with similarly numbered elements. For example, the environment 200 may include APs 210 (such as the APs 210*a*, 210*b*, 210*n*), STAs 220 (such as the STAs 220*a*, 220*b*), wireless sniffers 230 (such as the wireless sniffers 230*a*, 230*b*, and 230*n*), and a cloud system 240, which may be similar or comparable to the APIs 110, STAs 120, wireless sniffers 130, and/or the cloud system 140, respectively. The environment 200 may additionally include a premise 250 within which WLANs may be observed, and the premise may include one or more walls 252 separating the premise into individual spaces (e.g., apartments, businesses, etc.). The environment 200 may additionally include a wireless AP 212 that may be connected within an individual space, which may also include one or more devices operating within a wireless signal space, including a wireless telephone 251, a camera 252, and an appliance 253.

In some embodiments, various problems may be created at the premise 250 that the environment may help alleviate. For example, the wireless telephone 251, the camera 252, and/or the appliance 253 may broadcast and/or be operating in a frequency range and/or a channel that may cause interference with and/or degrade the wireless signal of the AP 210*b* in an adjacent individual space at the premise 250. As another example, the STA 220*b* may move beyond the range of the AP 210*b* and/or connect to another AP, such as the AP 212. As an additional example, a file transfer to or from the STA 220*a* may be interrupted.

While examples are provided, the present disclosure may include a series of scripts or other operations that may be performed to iteratively address potential issues or causes of observed problems in the wireless network. Such scripts may vary depending on a determined state of the system and the analyzed data obtained from the wireless sniffer 230 and/or the AP 210. In these and other embodiments, such debugging may result in modification of operation of one or more devices within the wireless network. After such modification, the wireless sniffer 230 and/or the AP 210 may continue to provide data to the cloud system 240 to validate whether or not the issue has been resolved/the performance improved. If the issue is alleviated but not completely resolved, the scripts may continue to run. In some embodiments, the use of such iterative data, including modification of operation of various devices, may result in a feedback loop via which the network may be modified, data may be collected in the modified network, and the network may be further modified.

With respect to the interference from the wireless telephone 251, the camera 252, the appliance 253, and/or the wireless AP 212, the use of the wireless sniffers 230 may facilitate addressing the problem. Following such an example, the AP 210*b* and/or the STA 220*b* may send a message to the cloud system 240 of signal degradation and/or difficulty in connecting or remaining connected. For example, a number threshold number of connection requests or reconnections may trigger a message being sent to the cloud system 240. Based on receiving the message, the cloud system 240 may send a message to one or more of the wireless sniffers (such as the wireless sniffers 230*b* and 230*c*) to obtain data in the frequency and channel at which the AP 210*b* is broadcasting. Additionally or alternatively, the cloud system 240 may send a message to the wireless sniffer 230*b* to obtain data at the frequency and channel at which the AP 210*b* is broadcasting, and may send a message to the wireless sniffer 230*c* to obtain data at multiple potential frequencies and/or channels which the API 210*b* may switch to instead of its current channel. The cloud system 240 may request the packet logger data from the API 210*b* to observe what occurred in the signal strength, and may observe the time-correlated data from the wireless sniffer(s) 230*b* and/or 230*c*. Based on the data, the cloud system 240 may observe that the wireless telephone 251, the camera 252, the appliance 253, and/or the wireless AP 212 are causing interference at a certain channel or frequency, and may send an instruction to the API 210*b* to change channels and/or frequencies over which it is broadcasting. In some embodiments, such a change may be informed and/or guided based on additional data from the wireless sniffer 230*c* obtaining data for potential new channels and/or frequencies for the AP 210*b*.

Continuing the example of interference, if the STA 220*b* is connected to the AP 210*a*, the AP 210*a* may not sense any signal causing interference at the channel or frequency at which it is broadcasting. For example, the API 210*a* may include a wireless sniffer 230*a* that may obtain data regarding the channel. However, by using the wireless sniffers 230*b* and/or 230*c*, the cloud system 240 may identify interference from the wireless telephone 251, the camera 252, the appliance 253, and/or the wireless AP 212 that may be causing interference for the STA 220*b*. Based on the information from the wireless sniffers 230*b* and/or 230*c*, the cloud system 240 may be able to observe the interference where the API 210*a* and/or the wireless sniffer 230*a* may not observe such interference.

Turning now to the example of the STA 220*b* moving beyond the range of the AP 210*b* and/or connect to the AP 212, the lack/change in connection may be analyzed and improved using a remote wireless sniffer. The wireless sniffer 230*b* may be enabled at the same individual space in the premise 250 as the AP 210*b*, and may be configured to run on the same channel and/or frequency as the AP 210*b*, and to continuously capture wireless traffic on the channel of the AP The wireless sniffer 230*b* may be synchronized to the same time as the cloud system 240 and/or the API 210*b*. An alert may be enabled to detect when the STA 220*b* disconnects, such as a syslog based trigger searching for the given MAC address 'xx:yy:zz:aa:bb:cc' of the STA 220*b* and a string similar to "wifi2_0: xx:yy:zz:aa:bb:cc disassociated" where wifi2_0 may correspond to the Wi-Fi signal broadcast by the API 210*b*. In operation, the STA 220*b* may connect successfully into the network broadcast by the API 210b, and may pass Wi-Fi traffic successfully. At a time ('t'), a user of the STA 220b may move with the STA 220b to the very edge of the wireless network broadcast by the API 210b where the signal to noise ratio is marginal. At this point, the STA 220b may lose its connection with the AP 210b due to the nature of the wireless signal being marginal (e.g., the STA 220b may find that the signal from the AP 212 may be stronger and so may disconnect from the AP 210b and connect to the API 212). Such an occurrence may trigger an event at the cloud system 240 at time t. In response, the cloud system 240 may send a message to the wireless sniffer 230b to obtain traces for a time window of t−30 seconds to t+30 seconds. In some embodiments, the wireless sniffer 230b may collect data until t+30, and may be received by the cloud system 240 at a time t+30+Δ, where Δ represents the time taken for the wireless sniffer 230b to process the request and send the obtained trace data.

Continuing the example, the cloud system 240 may utilize as input the wireless sniffer 230b trace files as gathered as described above, and the MAC address of the STA 220b (e.g., xx:yy:zz:aa:bb:cc), and may analyze data pertinent to data retry, authentication/association, and data pertinent to the PHY rate. Using such data, the cloud system 240 may generate a number of graphs illustrating how the PHY rate varies across time, packet transmissions and retransmissions to and from the STA 220b, and/or wireless sniffer traces (whether partial or full) from the wireless sniffer 230b showing attempted connection/reconnection events for the STA 220b. Additionally or alternatively, the cloud system 240 may request and/or otherwise obtain or access packet logger data from the AP 210b (and/or per node physical statistics if available) from time t−30 seconds to t+30 seconds, and may run an analysis on such files to extract relevant data related to the given MAC address. Using such information, the cloud system 240 may take the per node PHY stats data for the STA 220b, and may plot the digital backoff value (e.g., an integer value between 0 and 6, representing 0 dB to 12 dB of digital backoff) and may provide a plot over time against the digital backoff applied to the connection to the STA 220b. Such a plot may be overlaid or otherwise correlated with the graphs generated based on the data from the wireless sniffer 230b. Such correlated information and/or graphs may be presented on a graphical web page containing all and/or portions of the data in the one location.

In some embodiments, the cloud system 240 may analyze the data. In doing so, the cloud system 240 may determine that there are many retries of packets around the time of the event t, and a similar large number of retries from time t to time t+30. The cloud system 240 may additionally analyze the PHY rate variation data and may determine that the PHY rate of transmitted packets to the STA 220b drops from time t−30 to t. From time t to time t+30, the PHY rate to the STA 220b may remain at a very low value. Additionally, in analyzing the data, the cloud system 240 may determine that the STA 220b may have difficulty in reconnecting back to the AP 210b from time t to t+30, as shown by many attempted 'authentication', 'association' and possibly Extensible Authentication Protocol (EAP) over Local Area Network (LAN) (EAPOL) frame exchanges which repeat multiple times without success (e.g., there are many retries and authentication restarts a number of times).

Additionally or alternatively, the cloud system 240 may analyze the digital backoff for the STA 220b (xx:yy:zz:aa:bb:cc) as plotted against time t−30 to t+30, and may determine that the digital backoff applied to the given client varies from an integer value of 6 (12 dB backoff) to 0 (no backoff, e.g., maximum transmit power, with a maximum power of 12 dBm used). The cloud system 240 may examine the other output from the AP 210b, which may include detail of the maximum allowed transmit power being 12 dBm. The cloud system 240 may determine that the maximum transmit power for the AP 210b may be set to a very low value within the configuration for the AP 210b (e.g., a maximum transmit power of 12 dBm). By combining the various data and analyses, the cloud computing system 240 may identify a cause of the problem (low maximum transmit power), and may send a message to address the problem (e.g., sending a message to the AP 210b to adjust the maximum transmit power to a higher value as allowed by local regulations (18 dBm)).

To verify the effect of the operation of the cloud system 240 at addressing the issue, the user of the STA 220b may perform a similar task of moving with the STA 220b to the same location the problem was experienced before. During such a task, the cloud system 240 may monitor data from the AP 210b for repeated attempts at authentication/association to verify the problem was solved.

Turning to the example of a file transfer to or from the STA 220a being interrupted, an alert may be configured to trigger based on a packet logger statistic associated with the AP 210a to indicate when data loss occurs on the egress port of the AP 210a. A user of the STA 220a may connect to a wireless network via the AP 210a and may leave a networking page open at a network list page. The user may then start a large file transfer from the wireless network via the AP 210a, which shows stops and starts (at time 'a', 'b', 'c', . . . ). At points 'a', 'b', 'c', . . . , the cloud system 240 may trigger an alert, which may in turn cause the cloud system 240 to send a message to the wireless sniffer 230a to obtain and upload the traces for times a−30 seconds to a+30 seconds, b−30 seconds to b+30 seconds, etc. The cloud system 240 may utilize the MAC address of the STA 220a to request data from the AP 210a regarding data retry, the PHY rate with the STA 220a, etc. In some embodiments, the cloud system 240 may generate a series of time varying graphs plotting power save transitions per MAC address (which may be obtained from the STA 220a and/or the AP 210a), and a series of time varying graphs plotting the PHY rate per MAC address. In some embodiments, the cloud system 240 may gather packet logger data (e.g., statistical data) for the AP 210a for the time periods a−30 seconds to a+30 seconds, b−30 seconds to b+30 seconds, etc. Using such data, the cloud system 240 may generate a time series graph showing the number of drops experienced on the WLAN egress port. In these and other embodiments, the cloud system 240 may present a graphical web page containing all of the collected data and or graphs generated, and may present them in a temporally correlated manner.

Using the collected data, the cloud system 240 may identify that the STA 220a may be entering power save at times 'a', 'b', 'c', . . . and exiting power save mode at times 'a+δ', 'b+δ,' 'c+δ,' . . . , where δ may represent some time period. The cloud system 240 may additionally identify an output for PHY rate for the STA 220a and may determines the PHY rate is stable at a given rate (e.g., 866 Mbps), with gaps in the graph (e.g., due to no transmissions) at timestamps 'a', 'b', 'c', . . . .

Given the information, the cloud system 240 may determines that the timeline of the of drop in service on the WLAN egress port matches with each instance of power save transitions for the STA 220a. That is, the cloud system 240 may determine there are spikes in the graph of drops on the WLAN egress port from time 'a' to 'a+δ', 'b' to 'b+δ', .... Based on the determination, the cloud system 240 may determine that the cause of the stalled download is due to the STA 220*a* entering and exiting power save mode and causing WLAN egress packet drops. The cloud system may send a message to the user of the STA 220*a* to close the network list page in order to prevent power save transitions occurring during Wi-Fi network scan, which occurs whenever the network list page is open. Additionally or alternatively, the cloud system 240 may send a message to the STA 220*a* that automatically closes the network list page or otherwise changes a setting to modify operation of the power save mode to prevent the drop in service.

For each of the examples provided herein, and other resolution of potential issues in the wireless network, the actual cause may be determined via the use of a debugging script via which one or more most likely causes of the issue may be checked first, followed by other potential causes. In some embodiments, such issues may include the AP 230 rebooting or crashing, a complete wireless transmission or receiving failure for one or all STA 220, a failure of a network card or chip in the AP 230, continuous association and dissociation by the STA 220, a failure to associate by the STA 220, continuous band-steering (e.g., when the 5 GHz band is congested, not working properly, etc.), and/or upper layer issues such as host-side issues (e.g., Internet service provider (ISP) issues, Data Over Cable Service Interface Specification (DOCSIS) issues, etc.).

While certain analysis and detection operations are described as being performed by the cloud system 240, it will be appreciated that such observation and/or analysis of data and/or graphs may be performed by a human operator, such as an administrator or network technician. In these and other embodiments, the cloud system 240 may be configured to obtain and generate a display of the collected data (whether graphically or otherwise).

In some embodiments, the cloud system 240 may utilize a machine learning system or other pattern-identifying system to observe data from wireless sniffer 230 and the AP 210 and may use that data to identify a state of the overall system. For example, over time, the cloud system 240 may observe that certain trends in data correspond to certain errors such that they may be more readily and quickly addressed and solved. In some embodiments, the cloud system 240 may utilize data specific to a particular radio antenna of the AP 210, such as a short preamble decode error, a long preamble decode error, a cyclic redundancy check (CRC) error, a number of hardware vs. software buffer retries, a number of defers, the per chain transmit power, the noise floor for the radio antenna, the number of neighbor service set identifiers (SSIDs) that are on-channel and/or off-channel, and/or a number of beacon success/failures. In some embodiments, the cloud system 240 may utilize data specific to a particular STA 220, such as a per packet power control backoff (in dB), a size of an aggregated MAC service data unit (AMSDU) and/or aggregated multiple AMSDUs (AMPDU), beamforming capabilities available to the STA, MU-MIMO capabilities and/or usage stats of the STA, per chain received signal strength indicator (RSSI), error vector magnitude (EVM), received channel power indicator (RCPI), etc.

In some embodiments, the wireless sniffer 230 itself may be configured to monitor for certain errors. For example, the cloud system 240 may provide the wireless sniffer 230 a set number of conditions that may predictably correlate to a certain state of the system. Using such conditions, the wireless sniffer 230 may monitor for the existence of such a condition and may trigger a solution itself if the data provided by the cloud system 240 includes the solution. Additionally or alternatively, the wireless sniffer 230 may alert the cloud system 240 when such a condition is met.

Modifications, additions, or omissions may be made to the environment 200 without departing from the scope of the present disclosure. For example, the designations of different elements in the manner described is meant to help explain concepts described herein and is not limiting. Further, the environment 200 may include any number of other elements or may be implemented within other systems or contexts than those described. Additionally, while a small number of examples have been provided, any number of triggers may be included, any number of devices may be queried to provide data, any number of data analyses may be included, and/or any number of data visualizations may be generated.

Figure 3:
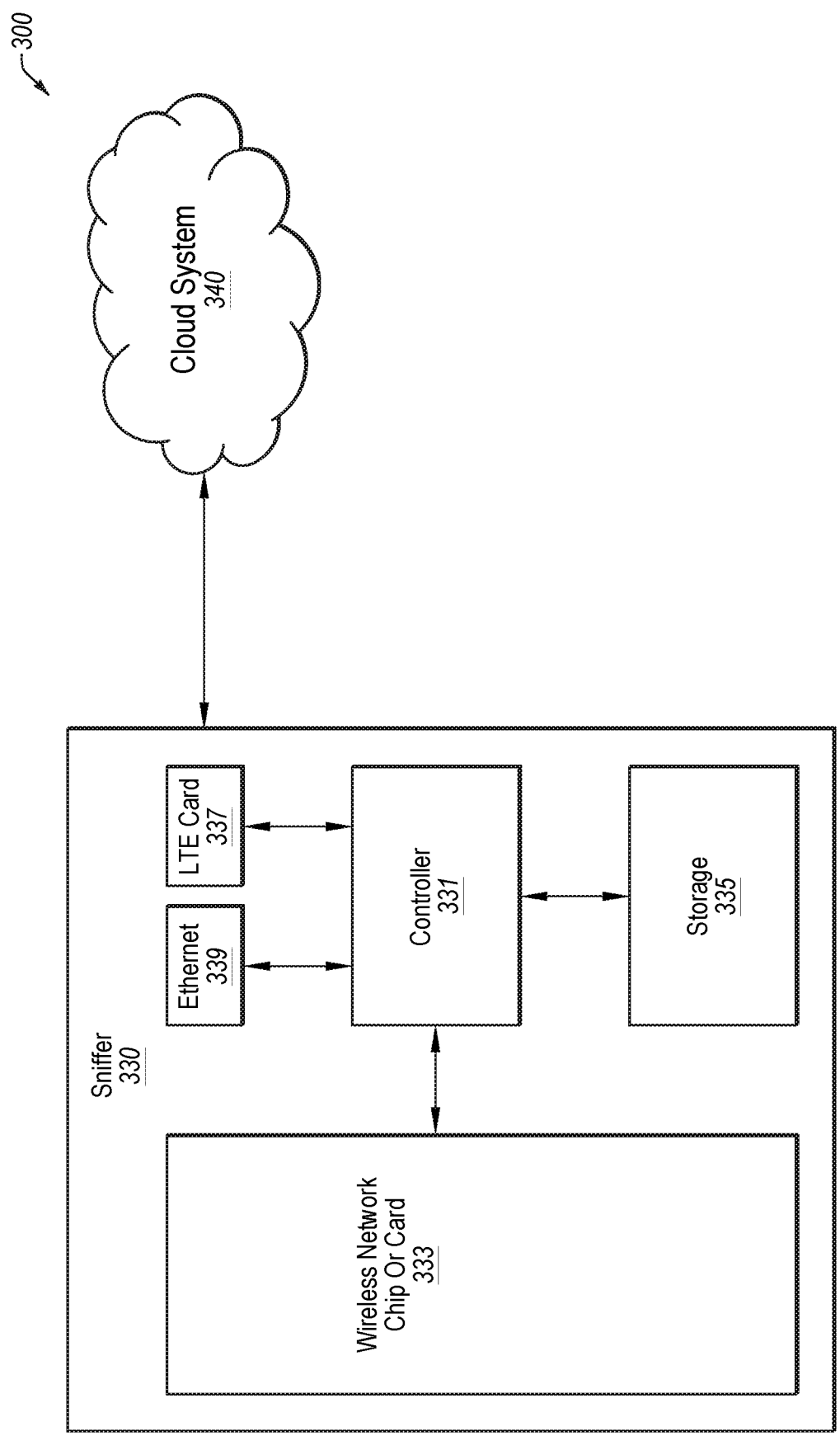
FIG. 3 is a block diagram of an example wireless sniffer.

FIG. 3 is a block diagram of an example system with a wireless sniffer 330 in communication with a cloud system 340, in accordance with one or more embodiments of the present disclosure. The wireless sniffer 330 may be similar or comparable to the wireless sniffer 130 and/or the wireless sniffer 230 of FIGS. 1 and 2, respectively. The cloud system 340 may be similar or comparable to the cloud system 140 and/or the cloud system 240 of FIGS. 1 and 2, respectively.

As illustrated in FIG. 3, the wireless sniffer 330 may include a controller 331, a wireless network chip or card 333, a storage 335, a Long Term Evolution (LTE) card 337, and/or an ethernet adapter 339.

The controller 331 may include any suitable special-purpose or general-purpose computer, computing entity, or processing device including various computer hardware or software modules and may be configured to execute instructions stored on any applicable computer-readable storage media. For example, the controller 331 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. In some embodiments, the controller 331 may operate using a particular operating system (OS), such as Linux®.

In some embodiments, the controller 331 may be configured to fetch program instructions from the storage 335 and perform the program instructions. Additionally or alternatively, the controller 331 may receive instructions to perform operations directly or indirectly from the cloud system 340.

The wireless network chip or card 333 may include any device, system, or component to permit the wireless sniffer 330 to listen to and/or obtain data from a wireless network. For example, the wireless network chip or card 333 may include an antenna and/or chipset configured to operate in a promiscuous mode such that the wireless network chip or card 333 obtains all packets to which the wireless sniffer 330 is exposed. In these and other embodiments, the wireless network chip or card 333 may be configured to operate at a given channel and/or frequency (e.g., channel 100 in the 2.4 GHz band).

The storage 335 may include any component, device, or system configured to store data, such as the data collected and/or observed by the wireless network chip or card 333. The storage 335 may be readable by computers or computing devices, such as the controller 331 and/or the cloud system 340. By way of example, and not limitation, the storage 335 may be implemented as Random Access Memory (RAM), Read-Only Memory (ROM), Electrically Erasable Programmable Read-Only Memory (EEPROM), optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. In some embodiments, the storage 335 may store triggers and corresponding actions, a rolling buffer of data observed, settings or other parameters informing a mode of operation of the wireless sniffer 330 (e.g., upon which channel/frequency the wireless sniffer 330 is to be obtaining data), etc.

The LTE card 337 may include any communication device or component configured to communicate with the could system 340. In some embodiments, the LTE card 337 may be configured to communicate over a different network or communication modality as compared to the wireless network chip or card 333. For example, the LTE card 337 may permit the wireless sniffer 330 to communicate over cellular networks without the use of a Wi-Fi signal. By communicating over a different modality, if the Wi-Fi network to which the wireless network chip or card 333 is listening has errors or problems communicating, the wireless sniffer 330 may still be able to communicate with the cloud system 340 via the LTE card 337.

The ethernet adapter 339 may include any communication device or component configured to communicate with other devices over a wired connection. For example, the ethernet adapter 339 may include a card or chip configured to provide wired connectivity to a network and/or to another device. For example, the ethernet adapter 339 may be used to provide a wired connection to a secondary computing device that provides additional processing and/or storage capabilities to the wireless sniffer 330. Additionally or alternatively, the secondary computing device may provide a user interface via which a user may observe a graphical user interface (GUI) or command line interface (CLI) and/or may type, click, swipe, tap, etc. to interact with and provide commands or instructions to the wireless sniffer 330.

In some embodiments, the ethernet adapter 339 may provide a secondary channel of communication in a network. For example, the wireless network card or chip 333 may obtain data regarding wirelessly transmitted packets in a network, and the ethernet adapter 339 may provide wired access to the same network. In these and other embodiments, the ethernet adapter 339 may be used to communicate with the cloud system 340 rather than or in addition to the LTE card 337.

Modifications, additions, or omissions may be made to the system 300 and/or the wireless sniffer 330 without departing from the scope of the present disclosure. For example, the designations of different elements in the manner described is meant to help explain concepts described herein and is not limiting. Further, the system 300 and/or the wireless sniffer 330 may include any number of other elements or may be implemented within other systems or contexts than those described.

Figure 4:
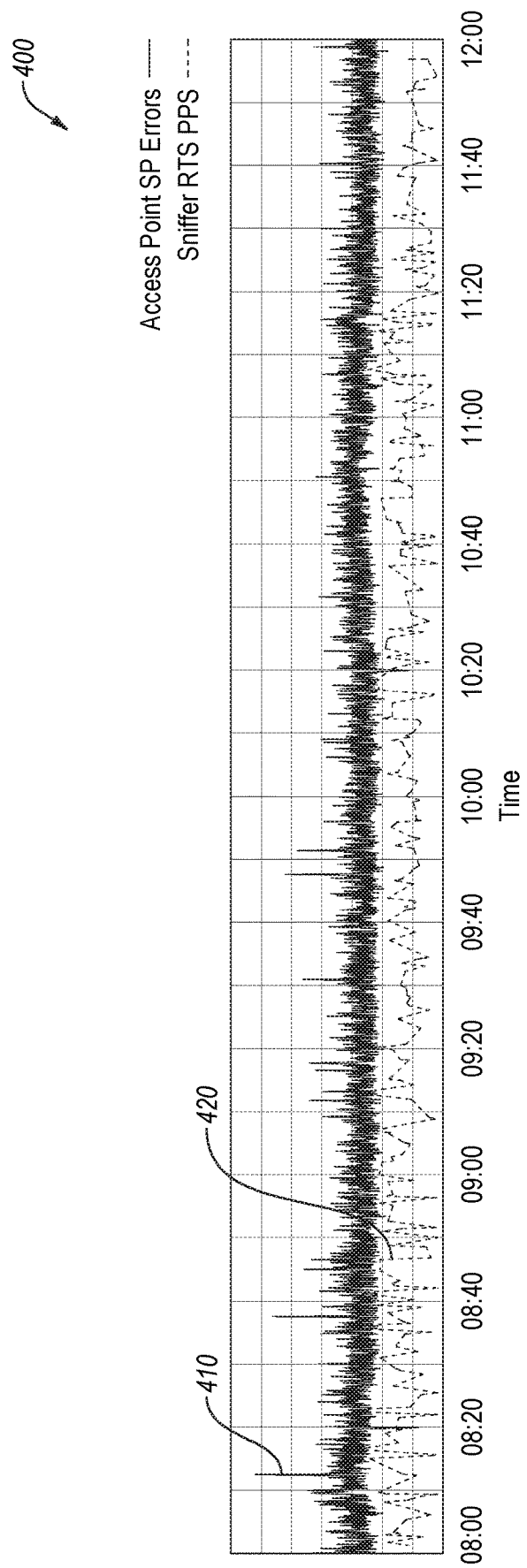
FIG. 4 is an example visualization of time correlated data.

FIG. 4 is an example visualization 400 of time correlated data, in accordance with one or more embodiments of the present disclosure. The visualization 400 may represent one or more of the graphs generated by the cloud system 140, 240 and/or 340 of FIGS. 1-3.

As illustrated in FIG. 4, the visualization 400 may include data 410 representing switch processor (SP) errors at an AP acquired and/or obtained from the AP. The visualization 400 may additionally include data 420 representing a number of Ready to Send (RTS) packets per second (PPS) as observed by a wireless sniffer. The two sets of data may be correlated in time such that events and/or occurrences between the two sets of data may be readily observed.

In some embodiments, additional data from either of the AP and/or the wireless sniffer may be displayed visually. The data may be displayed on the same visualization 400 (e.g., overlaid on the same time scale) or on a separate visualization that may include the same or a similar time window for visualization. Such data may include broadcast strength of the AP wireless channel, a number of block ACKs detected by the wireless sniffer per second, an AP modulation coding scheme (MCS) rate to a specific client or series of clients, etc.

Modifications, additions, or omissions may be made to the visualization 400 without departing from the scope of the present disclosure. For example, any number of data sets may be included and may be illustrated using any graphical style. As another example, rather than a graphical depiction, a tabular form or other depiction of raw data may be included.

Figure 5:
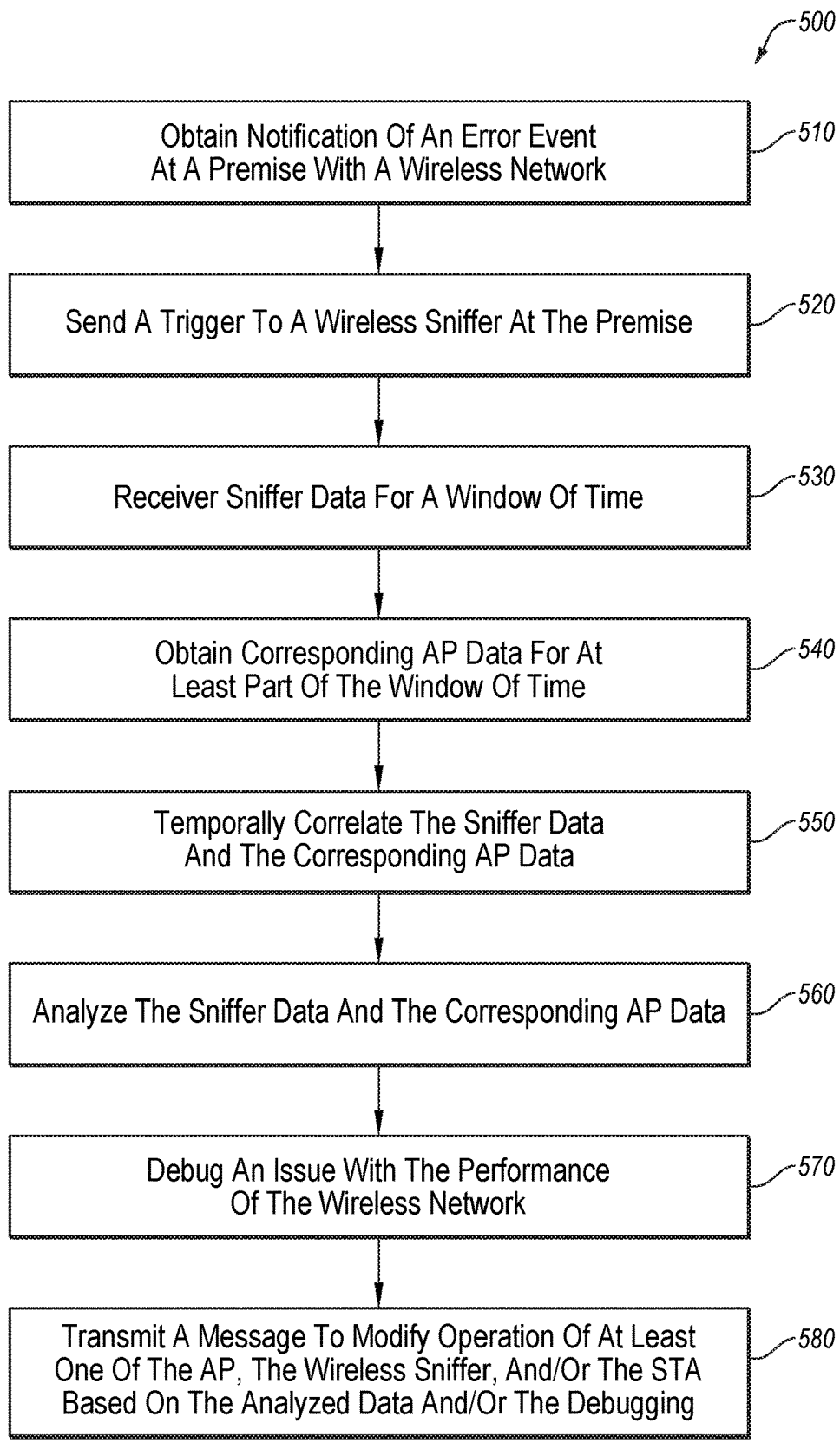
FIG. 5 is a flowchart of an example method of remote management of a wireless sniffer.

FIG. 5 is a flowchart of an example method 500 of remote management of a wireless sniffer, in accordance with one or more embodiments of the present disclosure. The method 500 may be implemented, in whole or in part, by one or more of the cloud system 140, the wireless sniffer 130, the AP 110; the cloud system 240, the wireless sniffer 230, the AP 210; the cloud system 340, and/or the wireless sniffer 330 of FIGS. 1, 2, and 3 respectively, or any combinations thereof.

At block 510, a notification may be obtained of an error event at a premise with a wireless network. For example, an administrator or other user may set one or more conditions as error events that may cause a device communicating on the wireless network to send the notification to a cloud system (such as the cloud system 140, 240, or 340 of FIG. 1, 2, or 3, respectively). In some embodiments, the notification may be provided by an AP (such as the AP 110 or 210 of FIG. 1 or 2, respectively), a STA (such as the STA 120 or 220 of FIG. 1 or 1, respectively), and/or a wireless sniffer (such as the wireless sniffer 130, 230, or 330 of FIG. 1, 2, or 3, respectively). Some examples of such error events include exceeding a threshold number of association/disassociations, exceeding a threshold number of times the same packet is sent, quantity of network traffic for a device dropping below a threshold, inability to connect or stay connected to a wireless network, etc.

In some embodiments, the notification may be detected by the cloud system itself. For example, one or more of the devices operating in and/or associated with the wireless network may periodically, regularly, or continuously provide data to the cloud system (e.g., unless instructed otherwise, the wireless sniffer may gather twenty seconds of data every ten minutes and provide it to the cloud system, regardless of whether or not the wireless sniffer received a trigger or other instruction to obtain data). The cloud system may monitor and/or analyze the data to detect such an error event or trigger.

At block 520, a trigger may be sent to a wireless sniffer at the premise. For example, based on the error event, the cloud system may send the trigger to the wireless sniffer to cause the wireless sniffer to obtain data at a particular broadcast frequency and/or channel. In some embodiments, the trigger may include instructions of which broadcast frequency and/or channel upon which the wireless sniffer is to obtain data. In some embodiments, the trigger may include an instruction that causes the wireless sniffer to send previously obtained data. For example, if the wireless sniffer keeps a rolling buffer of the last thirty seconds of data, the trigger may cause the wireless sniffer to send the previously obtained last thirty seconds (e.g., t–30 seconds) and the next thirty seconds (e.g., t+30 seconds) of data.

In some embodiments, the trigger may be sent based on data previously obtained by the cloud system. For example, the trigger may cause the wireless sniffer to obtain data at a different channel or frequency than the wireless sniffer was operating on previously. In this manner, the cloud system may operate in a feedback loop to adjust the wireless sniffer based on previously obtained data from the wireless sniffer.

At block 530, sniffer data for a window of time may be obtained. For example, the wireless sniffer may send the obtained data to the cloud system. Following the example above, the window of time may include the window with t–30 seconds and t+30 seconds of data.

At block 540, corresponding data from an AP may be obtained for at least part of the window of time for which the sniffer data was obtained. For example, the cloud system may request that the AP provide packet logger data, an error log, STA-specific data (e.g., based on MAC address), or other data from the AP for another window of time that at least partially overlaps in time with the sniffer data. In some embodiments, the AP data and the sniffer data may cover the same window of time.

At block 550, the sniffer data and the corresponding AP data may be temporally correlated. For example, the sniffer data and the corresponding AP data may be graphically depicted on a time scale sharing the same time axis such that corresponding events between the two data sets may be observed on a temporal scale. As another example, the sniffer data and the corresponding AP data may be interleaved in time such that corresponding events may be observed in a tabular or other data depiction format.

At block 560, the sniffer data and the corresponding AP data may be analyzed to assess performance of the wireless network. For example, the sniffer data and the corresponding AP data may be analyzed to determine whether or not an error or triggering event has occurred, whether or not an improvement in performance may be obtained or if other optimization of the wireless network is warranted, whether or not a configuration of the wireless network may benefit from being modified, etc. In these and other embodiments, the sniffer data and/or the corresponding AP data may be analyzed by an administrator, technician, or other user. Additionally or alternatively, the cloud system may automatically analyze the data, such as by using a machine learning or artificial intelligence system. In these and other embodiments, a set of conditions may be correlated to a state and a predictive model may be used to predict or otherwise estimate an area in which the wireless network may improve performance or some other issue with the wireless network. In some embodiments, the analysis may identify an issue deserving attention based on conditions existing at the same or similar point in time in one or both of the data sets. Examples of such causes may include interference with the wireless signal of an AP, insufficient broadcasting strength of an AP, a STA going into a power saving mode, etc.

At block 570, an issue with the performance of the wireless network may be debugged. For example, the cloud system may obtain or otherwise identify an issue with the wireless network at the block 560. The cloud system may initiate a series of scripts or other processes that may go through a series of steps to intelligently identify the cause of the issue and a resolution of the issue based on the wireless sniffer data and/or the corresponding AP data. For example, the scripts may automatically rule out the most likely causes of the issue based on the expected state of the wireless network based on the wireless sniffer data and the corresponding AP data. Continuing the example, if a STA is experiencing slow loading or poor wireless performance, the debugging script may first check for interference from an unknown node (e.g., the AP 212 in FIG. 2), may second check for the number of STAs and their usage in the current wireless network, may third check the number of packet drops for the particular STA experiencing the issue, may fourth check the broadcasting power of the AP, may fifth check any power-saving issues at the AP and/or the STA may sixth check for known issues of packet drops on the wired network and/or DOCSIS side, etc. In these and other embodiments, the scripts may be updated or modified based on machine learning or other data analysis performed by the cloud system such that the operation of the debugging may identify issues and their resolutions, and the cloud system may better correlate the given state of the wireless network with the given issue such that the debugging scripts may more readily arrive at the cause of the issue. The cloud system may utilize a feedback loop of the obtained data and the debugging to create more focused and effective debugging scripts.

At block 580, a message may be transmitted to at least one of the AP, the wireless sniffer, and/or the STA based on the analyzed sniffer data and corresponding AP data of the block 560 and/or the debugging of the block 570. For example, the cloud system may send instructions to the AP to change a channel or frequency it is using, to increase its broadcasting strength, or other remedial action to address a cause of the error. As another example, the cloud system may send instructions to the STA to disable a power-saving feature, to disable and reenable a wireless network card or chip, etc. In some embodiments, the message may be for a purpose other than directly addressing the cause of the error. For example, the message may cause the wireless sniffer to obtain data on a different channel or frequency, or to alternate between multiple frequencies and/or channels such that the cloud system may have additional data to provide a recommendation for addressing the cause of the error.

One skilled in the art will appreciate that, for this and other processes and methods disclosed herein, the functions performed in the processes and methods may be implemented in differing order. For example, the operations 520, 530, and 540 may be performed in a different order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

FIG. 6 illustrates an example computing system 600 associated with remote management of a wireless sniffer, according to at least one embodiment described in the present disclosure. The computing system 600 may include a processor 610, a memory 620, a data storage 630, and/or a communication unit 640, which all may be communicatively coupled. Any or all of the wireless sniffers, APs, STAs, and/or cloud systems of FIGS. 1-3 may be implemented by a computing system consistent with the computing system 600. Additionally or alternatively, any of the operations of the method 500 of FIG. 5 may be performed by a computing system consistent with the computing system 600. For example, the computing system 600 may obtain sniffer data and AP data, and may correlate that data and use the correlated data to facilitate prediction of a cause of an error.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620. After the program instructions are loaded into the memory 620, the processor 610 may execute the program instructions, such as instructions to perform any of the operations of the method 500 of FIG. 5.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a Wi-Fi device, a Wi-Max device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a MIMO apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

CSI from any of the communication links described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, and the like.

The following examples pertain to further embodiments.

Example 1 includes a method that includes receiving, from a wireless sniffer, sniffer data for a window of time, the sniffer data including wireless signal data, obtaining corresponding access point data from an access point in a wireless network for at least part of the window of time for which the sniffer data is received, and analyzing the sniffer data and the corresponding access point data to assess performance of the wireless network.

In Example 2, the subject matter of Example 1 further including transmitting a message to the access point to cause the access point to change a setting in the access point based on the analysis of the sniffer data and the corresponding access point data.

In Example 3, the subject matter of any one of Examples 1-2, where the message to cause the access point to change the setting causes the access point to perform at least one of increasing broadcast power, decreasing broadcast power, changing a channel or frequency on which the access point broadcasts, changing channel bandwidth, toggling between multi-user, multiple-input, multiple-output (MU-MIMO) and single-user (SU)-MIMO, switching on or off transmission beam-forming to a client device, changing a receiving sensitivity, changing Aggregated MAC Protocol Data Unit (AMPDU)/Aggregated MAC Service Data Unit (AMSDU) aggregation sizes, or power-cycling the access point.

In Example 4, the subject matter of any one of Examples 1-3 further including transmitting a message to the wireless sniffer to cause the wireless sniffer to change a mode of operation based on the analysis of the sniffer data and the corresponding access point data.

In Example 5, the subject matter of any one of Examples 1-4, where the message to cause the wireless sniffer to change the mode of operation causes the wireless sniffer to perform one of changing a channel or frequency on which the wireless sniffer collects data, changing a duration during which the wireless sniffer collects data, or imposing a filter on operation of the wireless sniffer.

In Example 6, the subject matter of any one of Examples 1-5 further including receiving a notification of an error event at a premise with the wireless network, and sending a trigger to the wireless sniffer in response to the receiving the notification of the error event, the trigger causing the wireless sniffer to report wireless signal data.

In Example 7, the subject matter of any one of Examples 1-6, further including detecting an error event based on data from at least one of the access point, the wireless sniffer, or a station utilizing the wireless network, and sending a trigger to the wireless sniffer in response to detecting the error event, the trigger causing the wireless sniffer to report wireless signal data.

In Example 8, the subject matter of any one of Examples 1-7, where the error event is detected based on data from one or more access points. The method further includes receiving the data from the one or more access points within the wireless network. Each of the access points include association messages, dissociation messages, or combinations thereof, within a threshold time.

In Example 9, the subject matter of any one of Examples 1-8 further including transmitting a message to a station utilizing the wireless network to cause the station to change a setting in the station based on the analysis of the sniffer data and the corresponding access point data.

In Example 10, the subject matter of any one of Examples 1-9, where the message to cause the station to change the setting in the station causes the station to perform at least one of suppressing a power-saving feature, changing settings of a wireless network card or chip, disabling and reenabling the wireless network card or chip, or power-cycling the station.

In Example 11, the subject matter of any one of Examples 1-10, where the wireless sniffer is configured to continuously obtain wireless signal data regardless of whether or not a trigger is sent to the wireless sniffer.

In Example 12, the subject matter of any one of Examples 1-11, where the wireless sniffer is configured to periodically send the obtained data regardless of whether or not the trigger is sent to the wireless sniffer.

In Example 13, the subject matter of any one of Examples 1-12 further including debugging an issue with the performance of the wireless network based on the analysis of the sniffer data and the corresponding access point data.

In Example 14, the subject matter of any one of Examples 1-13, where the debugging includes a series of scripts with iterative operations informed by the analysis of the sniffer data and the corresponding access point data. The method further includes transmitting a message to change a mode of operation to one of the access point, the wireless sniffer, or a station utilizing the wireless network.

Example 15 includes one or more non-transitory computer-readable media containing instructions that, in response to being executed by one or more processors, cause a system to perform operations including receiving, from a wireless sniffer, sniffer data for a window of time, the sniffer data including wireless signal data, obtaining corresponding access point data from an access point in a wireless network for at least part of the window of time for which the sniffer data is received, and analyzing the sniffer data and the corresponding access point data to assess performance of the wireless network.

In Example 16, the subject matter of Example 15, where the operations further include receiving a notification of an error event at a premise with the wireless network, and sending a trigger to the wireless sniffer in response to the receiving the notification of the error event, the trigger causing the wireless sniffer to report wireless signal data.

In Example 17, the subject matter of any one of Examples 15-16, where the operations further include detecting an error event based on data from at least one of the access point, the wireless sniffer, or a station utilizing the wireless network, and sending a trigger to the wireless sniffer in response to detecting the error event, the trigger causing the wireless sniffer to report wireless signal data.

Example 18 is a system that includes one or more processors, and one or more non-transitory computer-readable media containing instructions that, in response to being executed by one or more processors, cause the system to perform operations that includes receiving, from a wireless sniffer, sniffer data for a window of time, the sniffer data including wireless signal data, obtaining corresponding access point data from an access point in a wireless network for at least part of the window of time for which the sniffer data is received, and analyzing the sniffer data and the corresponding access point data to assess performance of the wireless network.

In Example 19, the subject matter of Example 18, where the operations further include receiving a notification of an error event at a premise with the wireless network, and sending a trigger to the wireless sniffer in response to the receiving the notification of the error event, the trigger causing the wireless sniffer to report wireless signal data.

In Example 20, the subject matter of any one of Examples 18-19, where the operations further include detecting an error event based on data from at least one of the access point, the wireless sniffer, or a station utilizing the wireless network, and sending a trigger to the wireless sniffer in response to detecting the error event, the trigger causing the wireless sniffer to report wireless signal data.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

Unless specific arrangements described herein are mutually exclusive with one another, the various implementations described herein can be combined to enhance system functionality and/or to produce complementary functions. Such combinations will be readily appreciated by those skilled in the art given the totality of the foregoing description. Likewise, aspects of the implementations may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will, therefore, be appreciated that the above description has been given by way of example only and that modification in detail may be made within the scope of the present invention.

Computer-executable instructions may include, for example, instructions and data which cause a general-purpose computer, special-purpose computer, or special-purpose processing device (e.g., one or more processors) to perform or control performance of a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" or "an implementation" does not imply that such embodiment or implementation is essential to the subject technology or that such embodiment or implementation applies to all configurations of the subject technology. A disclosure relating to an embodiment or implementation may apply to all embodiments or implementations, or one or more embodiments or implementations. An embodiment or implementation may provide one or more examples of the disclosure. A phrase such as "an embodiment" or "an implementation" may refer to one or more embodiments or implementations and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed herein is intended to be dedicated to the public regardless of whether such disclosure is explicitly recited in the above description.

The present disclosure is not to be limited in terms of the particular implementations described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various implementations of the present disclosure have been described herein for purposes of illustration, and various modifications may be made without departing from the scope and spirit of the present disclosure. Accordingly, the various implementations disclosed herein are not intended to be limiting.

What is claimed is:

1. A method comprising:
   receiving, from a wireless sniffer, sniffer data for a window of time, the sniffer data including wireless signal data;
   obtaining corresponding access point data from an access point in a wireless network for at least part of the window of time for which the sniffer data is received;
   analyzing the sniffer data and the corresponding access point data to assess performance of the wireless network;
   transmitting a message to the wireless sniffer to cause the wireless sniffer to change a mode of operation, wherein the message to cause the wireless sniffer to change the mode of operation causes the wireless sniffer to change a channel or frequency on which the wireless sniffer collects the access point data.

2. The method of claim 1, further comprising transmitting a message to the access point to cause the access point to change a setting in the access point based on the analysis of the sniffer data and the corresponding access point data.

3. The method of claim 2, wherein the message to cause the access point to change the setting causes the access point to perform at least one of increasing broadcast power, decreasing broadcast power, changing a channel or frequency on which the access point broadcasts, changing channel bandwidth, toggling between multi-user, multiple-input, multiple-output (MU-MIMO) and single-user (SU)-MIMO, switching on or off transmission beam-forming to a client device, changing a receiving sensitivity, changing Aggregated MAC Protocol Data Unit (AMPDU)/Aggregated MAC Service Data Unit (AMSDU) aggregation sizes, or power-cycling the access point.

4. The method of claim 1, wherein the message to the wireless sniffer to cause the wireless sniffer to change a mode of operation is determined based on the analysis of the sniffer data and the corresponding access point data.

5. The method of claim 4, wherein the message to cause the wireless sniffer to change the mode of operation causes the wireless sniffer to perform one of changing a channel or frequency on which the wireless sniffer collects the wireless signal data, changing a duration during which the wireless sniffer collects data, or imposing a filter on operation of the wireless sniffer.

6. The method of claim 1, further comprising:
   receiving a notification of an error event at a premise with the wireless network; and
   sending a trigger to the wireless sniffer in response to the receiving the notification of the error event, the trigger causing the wireless sniffer to report wireless signal data.

7. The method of claim 1, further comprising:
   detecting an error event based on data from at least one of the access point, the wireless sniffer, or a station utilizing the wireless network; and
   sending a trigger to the wireless sniffer in response to detecting the error event, the trigger causing the wireless sniffer to report wireless signal data.

8. The method of claim 7, wherein the error event is detected based on data from a plurality of access points, the method further comprising receiving the data from the plurality of access points within the wireless network, each of the plurality of access points including a plurality of association messages, dissociation messages, or combinations thereof, within a threshold time.

9. The method of claim 1, further comprising transmitting a message to a station utilizing the wireless network to cause the station to change a setting in the station based on the analysis of the sniffer data and the corresponding access point data.

10. The method of claim 9, wherein the message to cause the station to change the setting in the station causes the station to perform at least one of suppressing a power-saving feature, changing settings of a wireless network card or chip, disabling and reenabling the wireless network card or chip, or power-cycling the station.

11. The method of claim 1, wherein the wireless sniffer is configured to continuously obtain wireless signal data regardless of whether or not a trigger is sent to the wireless sniffer.

12. The method of claim 11, wherein the wireless sniffer is configured to periodically send the obtained data regardless of whether or not the trigger is sent to the wireless sniffer.

13. The method of claim 1, further comprising debugging an issue with the performance of the wireless network based on the analysis of the sniffer data and the corresponding access point data.

14. The method of claim 13, wherein the debugging includes a series of scripts with iterative operations informed by the analysis of the sniffer data and the corresponding access point data, the method further comprising transmitting a message to change a mode of operation to one of the access point, the wireless sniffer, or a station utilizing the wireless network.

15. One or more non-transitory computer-readable media containing instructions that, in response to being executed by one or more processors, cause a system to perform operations comprising:
  receiving, from a wireless sniffer, sniffer data for a window of time, the sniffer data including wireless signal data;
  obtaining corresponding access point data from an access point in a wireless network for at least part of the window of time for which the sniffer data is received;
  analyzing the sniffer data and the corresponding access point data to assess performance of the wireless network;
  transmitting a message to the wireless sniffer to cause the wireless sniffer to change a mode of operation, wherein the message to cause the wireless sniffer to change the mode of operation causes the wireless sniffer to change a channel or frequency on which the wireless sniffer collects the access point data.

16. The computer-readable media of claim 15, wherein the operations further comprise:
  receiving a notification of an error event at a premise with the wireless network; and
  sending a trigger to the wireless sniffer in response to the receiving the notification of the error event, the trigger causing the wireless sniffer to report wireless signal data.

17. The computer-readable media of claim 15, wherein the operations further comprise:
  detecting an error event based on data from at least one of the access point, the wireless sniffer, or a station utilizing the wireless network; and
  sending a trigger to the wireless sniffer in response to detecting the error event, the trigger causing the wireless sniffer to report wireless signal data.

18. A system comprising:
  one or more processors; and
  one or more non-transitory computer-readable media containing instructions that, in response to being executed by one or more processors, cause the system to perform operations comprising:
    receive, from a wireless sniffer, sniffer data for a window of time, the sniffer data including wireless signal data;
    obtain corresponding access point data from an access point in a wireless network for at least part of the window of time for which the sniffer data is received;
    analyze the sniffer data and the corresponding access point data to assess performance of the wireless network;
    transmit a message to the wireless sniffer to cause the wireless sniffer to change a mode of operation, wherein the message to cause the wireless sniffer to change the mode of operation causes the wireless sniffer to change a channel or frequency on which the wireless sniffer collects the access point data.

19. The system of claim 18, wherein the operations further comprise:
  receive a notification of an error event at a premise with the wireless network; and
  send a trigger to the wireless sniffer in response to the receiving the notification of the error event, the trigger causing the wireless sniffer to report wireless signal data.

20. The system of claim 18, wherein the operations further comprise:
  detect an error event based on data from at least one of the access point, the wireless sniffer, or a station utilizing the wireless network; and
  send a trigger to the wireless sniffer in response to detecting the error event, the trigger causing the wireless sniffer to report wireless signal data.

* * * * *